United States Patent
Hosokai et al.

(10) Patent No.: US 12,404,967 B2
(45) Date of Patent: Sep. 2, 2025

(54) STAND, METHOD OF MANUFACTURING STAND, AND KEYBOARD-STAND SET

(71) Applicant: LENOVO (SINGAPORE) PTE. LTD., Singapore (SG)

(72) Inventors: Tatsuya Hosokai, Yokohama (JP); Hidehisa Mori, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 188 days.

(21) Appl. No.: 18/522,195

(22) Filed: Nov. 28, 2023

(65) Prior Publication Data

US 2024/0263733 A1 Aug. 8, 2024

(30) Foreign Application Priority Data

Feb. 7, 2023 (JP) .................................. 2023-016985

(51) Int. Cl.
| | |
|---|---|
| *G06F 1/16* | (2006.01) |
| *B29C 65/48* | (2006.01) |
| *F16M 13/00* | (2006.01) |
| *H05K 5/00* | (2025.01) |
| *H05K 7/00* | (2006.01) |
| *B29L 31/00* | (2006.01) |

(52) U.S. Cl.
CPC ........... *F16M 13/00* (2013.01); *B29C 65/486* (2013.01); *B29L 2031/7502* (2013.01)

(58) Field of Classification Search
CPC .................. F16M 13/00; B29C 65/486; B29L 2031/7502; G06F 1/1632; G06F 1/1633; G06F 1/1626; G06F 1/1654
See application file for complete search history.

(56) References Cited

U.S. PATENT DOCUMENTS

| | | | | |
|---|---|---|---|---|
| 2011/0174533 | A1* | 7/2011 | Nagano ................ | H03H 9/1021 29/832 |
| 2013/0088818 | A1* | 4/2013 | Yamaguchi ................ | C09J 7/30 361/679.01 |
| 2013/0194516 | A1* | 8/2013 | Hayashiyama ........ | H04N 5/655 361/752 |
| 2014/0146451 | A1* | 5/2014 | Aoki ..................... | H03H 9/1057 361/679.01 |
| 2015/0190114 | A1* | 7/2015 | Ninomiya .............. | A61B 8/467 600/437 |
| 2020/0347987 | A1* | 11/2020 | Lee ........................ | B29C 48/022 |
| 2023/0292565 | A1* | 9/2023 | Morino ............... | H04M 1/0268 |

FOREIGN PATENT DOCUMENTS

JP 2018105961 A 7/2018

* cited by examiner

*Primary Examiner* — Anthony M Haughton
(74) *Attorney, Agent, or Firm* — SHIMOKAJI IP

(57) ABSTRACT

A stand supports an electronic apparatus in an erect state. The stand includes: a supporting portion that has a supporting surface which supports a rear surface of the electronic apparatus; a leg portion that is rotatably connected to the supporting portion via a hinge; a flexible member that has flexibility, that is formed in a sheet shape, and that is provided along one edge of the supporting portion so as to protrude from the one edge; a surface material that has flexibility and forms front surfaces of the supporting portion and the flexible member; a first bonding layer that fixes the surface material onto the supporting portion; and a second bonding layer that is formed to have a lower coating density of a bonding adhesive than the first bonding layer and fixes the surface material onto the flexible member.

10 Claims, 10 Drawing Sheets

STAND, METHOD OF MANUFACTURING STAND, AND KEYBOARD-STAND SET

BACKGROUND OF THE INVENTION

Field of the Invention

The present invention relates to a stand that supports an electronic apparatus in an erect state, a method of manufacturing the stand, and a keyboard-stand set.

Description of the Related Art

In recent years, thin electronic apparatuses such as laptop PCs and tablet PCs, each of which has a touch panel type display and does not have a physical keyboard, have become widespread. Regarding the type of the electronic apparatuses, it is easy to carry the electronic apparatus since the input work may be performed through the touch panel. As a result, it is easy to operate the electronic apparatus. However, it is difficult for such an electronic apparatus to be used independently like a general clamshell type laptop PC. Therefore, the present applicant has proposed a kickstand-type stand that supports an electronic apparatus in an erect state in Japanese Unexamined Patent Application Publication No. 2018-105961.

SUMMARY OF THE INVENTION

In the stand as described above, for example, a member having flexibility may be provided at a part that supports a side surface of the electronic apparatus. Further, it is assumed that such a member having flexibility will be used as a flexible hinge for connecting the electronic apparatus or other device and the stand. Therefore, it is necessary for the member having flexibility to have high pliability in order to ensure operability at the time of bending or the like.

The present invention has been made in view of the above-described problems, and it is an object thereof to provide a stand capable of improving the pliability of a member having flexibility, a method of manufacturing the stand, and a keyboard-stand set.

According to a first aspect of the present invention, there is provided a stand that supports an electronic apparatus in an erect state. The stand includes: a supporting portion that has a supporting surface which supports a rear surface of the electronic apparatus; a leg portion that is rotatably connected to the supporting portion via a hinge; a flexible member that has flexibility, that is formed in a sheet shape, and that is provided along one edge of the supporting portion so as to protrude from the one edge; a surface material that has flexibility and forms front surfaces of the supporting portion and the flexible member; a first bonding layer that fixes the surface material onto the supporting portion; and a second bonding layer that is formed to have a lower coating density of a bonding adhesive than the first bonding layer and fixes the surface material onto the flexible member.

According to a second aspect of the present invention, there is provided a method of manufacturing a stand that supports an electronic apparatus in an erect state. The method includes: a bonding portion formation step of providing a bonding adhesive on an inner surface of a surface material formed in a sheet shape and forming a first bonding portion and a second bonding portion which has a lower coating density of the bonding adhesive than the first bonding portion; a supporting portion formation step of forming a supporting portion that supports a rear surface of the electronic apparatus by bonding the surface material to a plate-like member via the first bonding portion, after the bonding portion formation step; a flexible member formation step of forming a flexible member, which has flexibility, which is formed in a sheet shape, and which is provided along one edge of the supporting portion so as to protrude from the one edge, by bonding two surface materials via the second bonding portion, after the bonding portion formation step; and a leg portion mount step of rotatably mounting a leg portion on the supporting portion via a hinge, after the supporting portion formation step.

According to a third aspect of the present invention, there is provided a keyboard-stand set including: a keyboard that is for wirelessly inputting to an electronic apparatus; and a stand that is for supporting the electronic apparatus in an erect state. The stand includes a supporting portion that has a supporting surface which supports a rear surface of the electronic apparatus, a leg portion that is rotatably connected to the supporting portion via a hinge, a flexible member that has flexibility, that is formed in a sheet shape, that is provided along one edge of the supporting portion so as to protrude from the one edge, and that functions as a flexible hinge which rotatably connects the stand and one edge of the keyboard, a surface material that has flexibility and forms front surfaces of the supporting portion and the flexible member, a first bonding layer that fixes the surface material onto the supporting portion, and a second bonding layer that is formed to have a lower coating density of a bonding adhesive than the first bonding layer and fixes the surface material onto the flexible member.

According to the above-described aspects of the present invention, pliability of the member having flexibility can be improved.

DETAILED DESCRIPTION OF THE INVENTION

Hereinafter, a stand and a keyboard-stand set according to embodiments of the present invention will be described in detail with reference to suitable embodiments and the accompanying drawings.

Figure 1:
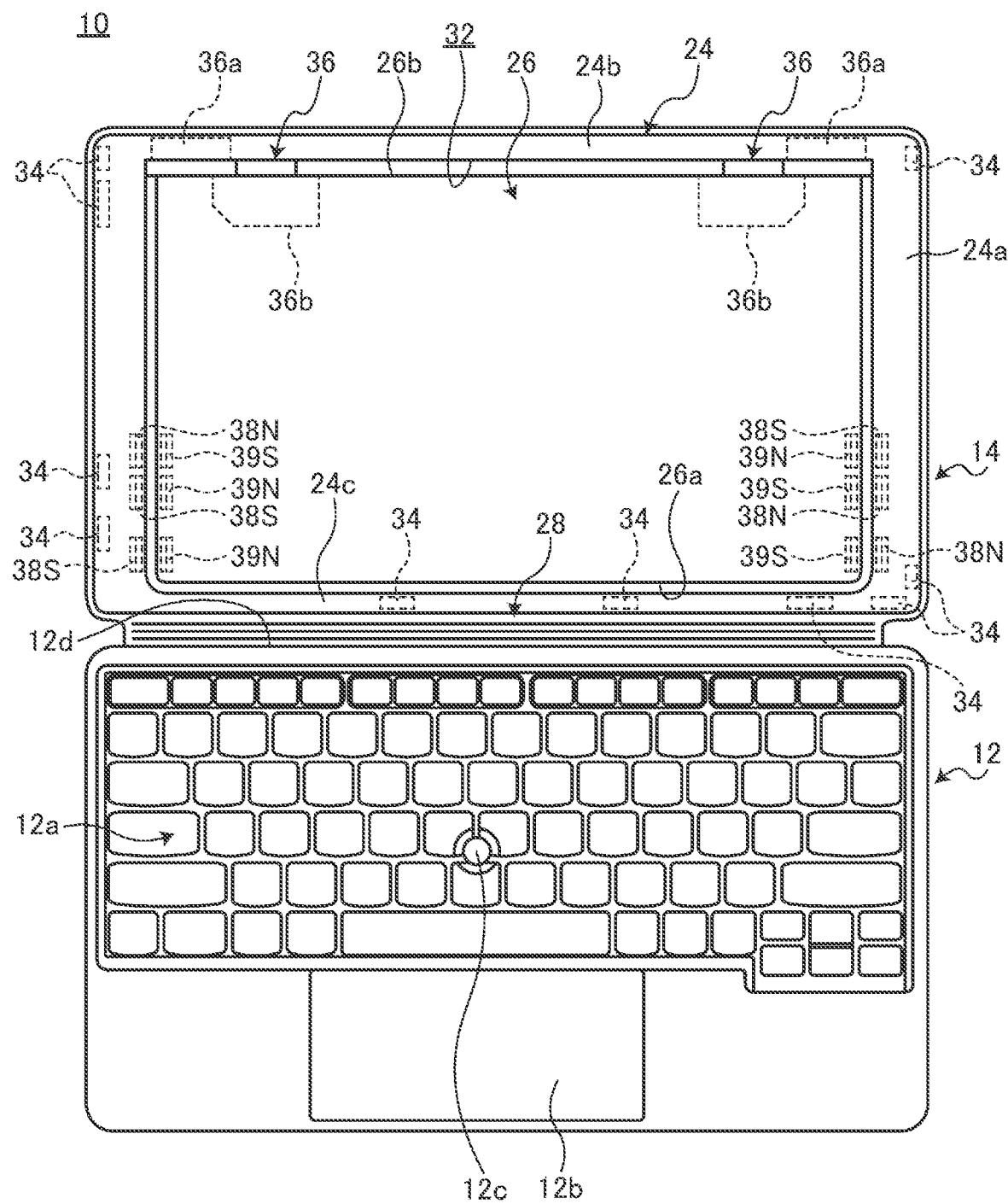
FIG. 1 is a plan view of a keyboard-stand set according to an embodiment.
Figure 2:
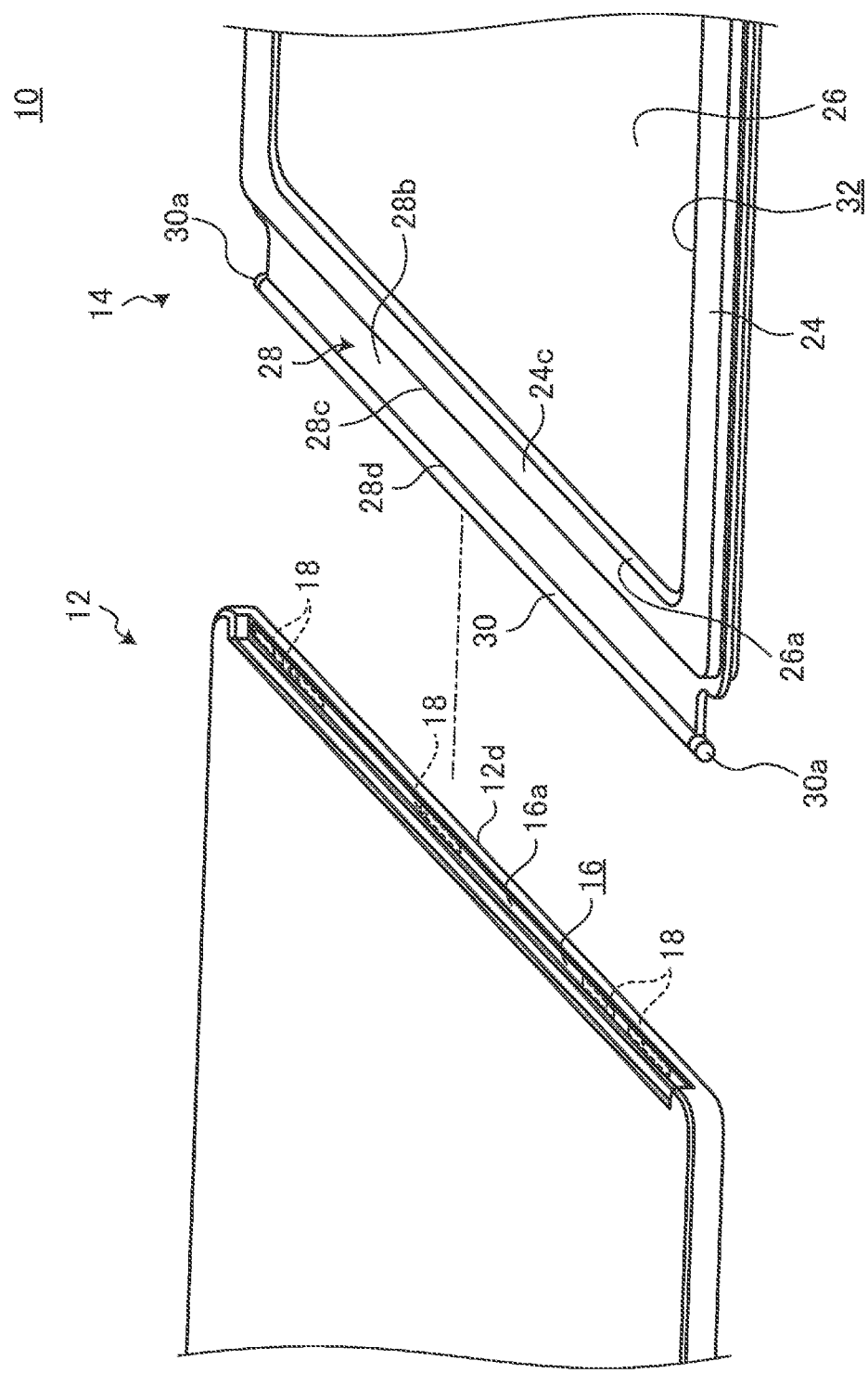
FIG. 2 is an exploded perspective view of a keyboard and a stand as viewed from a rear side.

FIG. 1 is a plan view of a keyboard-stand set 10 according to the embodiment. FIG. 2 is an exploded perspective view of a keyboard 12 and a stand 14 as viewed from a rear side.

As illustrated in FIGS. 1 and 2, the keyboard-stand set 10 according to the present embodiment includes the keyboard 12 and the stand 14.

First, the keyboard 12 will be described.

The keyboard 12 is a device that is for wirelessly inputting to the electronic apparatus. As the electronic apparatus, a portable computer that does not have a physical keyboard is mostly considered. Examples thereof include thin electronic apparatuses such as a foldable PC, a tablet PC, and a smartphone. Wireless communication performed between the keyboard 12 and the electronic apparatus includes, for example, Bluetooth (registered trademark).

The keyboard 12 has a flat box shape having a general size. A plurality of keys 12a, a touch pad 12b, and a pointing stick 12c, which are aligned, are provided on the upper surface of the keyboard 12. The keyboard 12 illustrated in FIG. 1 is a compact type that does not have a numeric keypad, but may be a full-size type that has a numeric keypad, an independently disposed cursor key, or the like. The keyboard 12 has a battery. In the keyboard 12, one or both of the touch pad 12b and the pointing stick 12c may be removed.

In the keyboard 12, a recessed portion 16 is formed on a rear side edge portion 12d. The recessed portion 16 extends along the edge portion 12d and is open toward the lower surface side. The recessed portion 16 has a height and a length by which the bar 30 to be described later can be inserted and fit into the recessed portion 16. A plurality of magnets 18 are provided on an upper surface 16a of the recessed portion 16. In the case of the present embodiment, two magnets 18 are provided in the vicinity of each of both ends of the upper surface 16a and one magnet 18 is provided in the central portion. Consequently, a total of five magnets 18 is provided (refer to FIG. 2). The number, positions, and sizes of the magnets 18 are not limited thereto. The magnet 18 is covered with a thin cover which forms the upper surface 16a.

Next, the stand 14 will be described.

Figure 3:
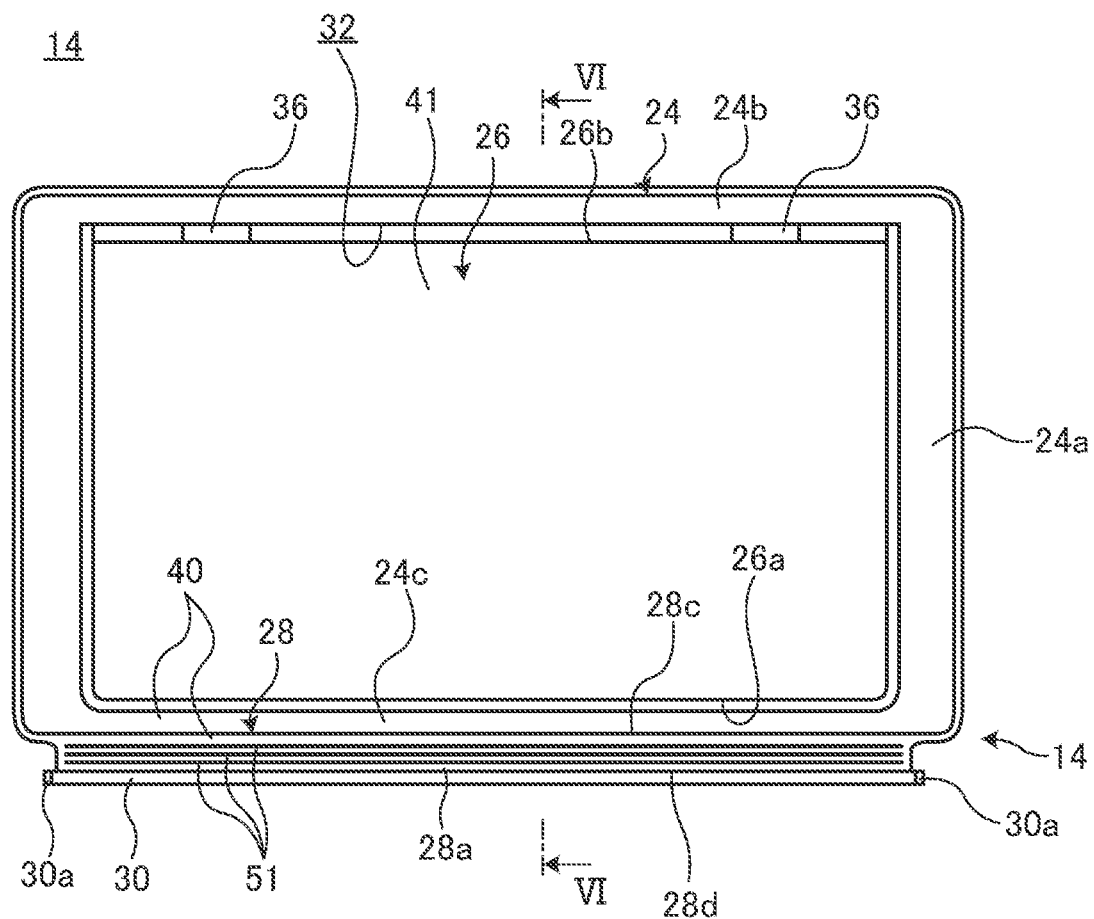
FIG. 3 is a front view of the stand.
Figure 4:
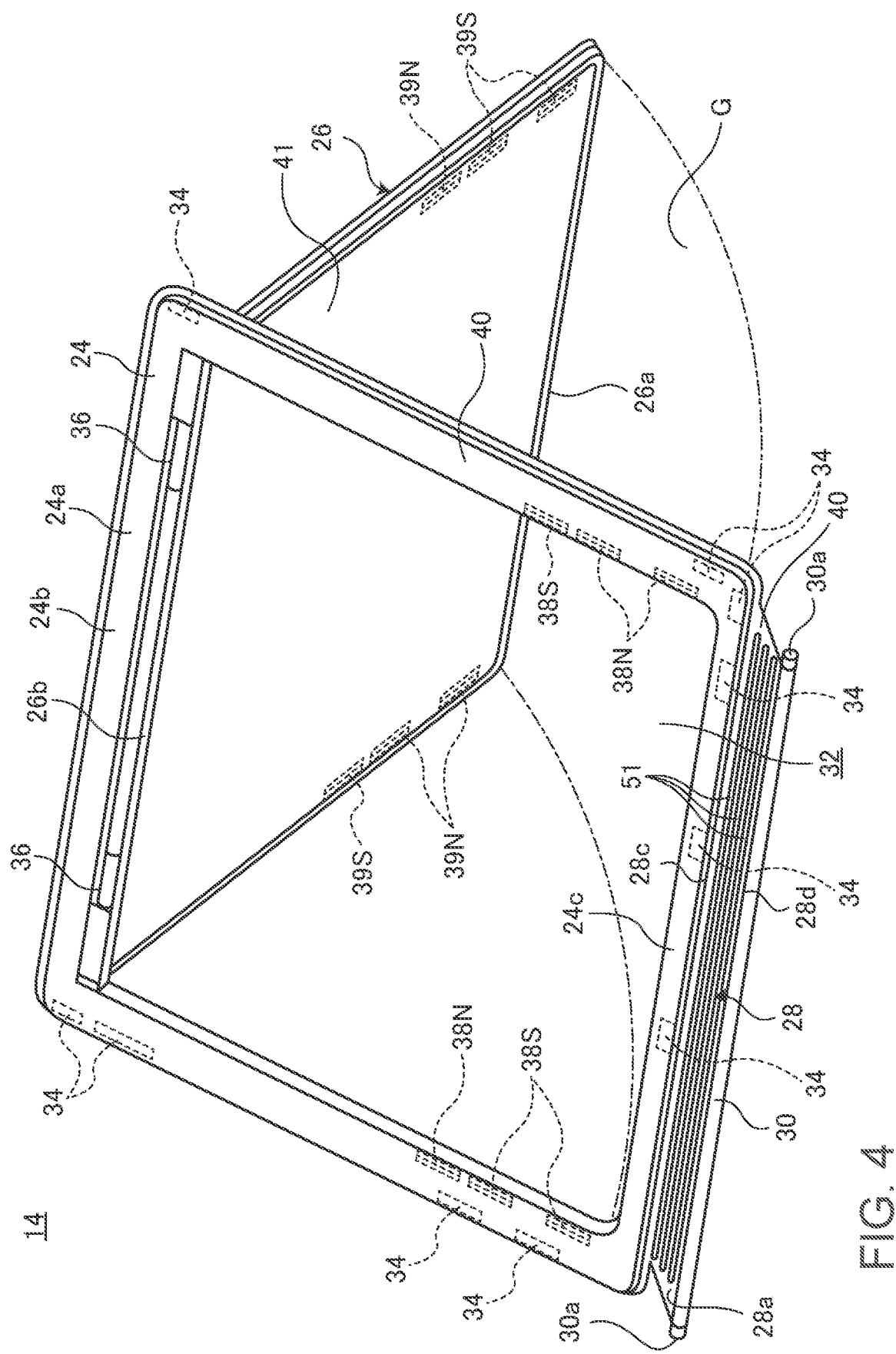
FIG. 4 is a perspective view of the stand in an erect state.
Figure 5:
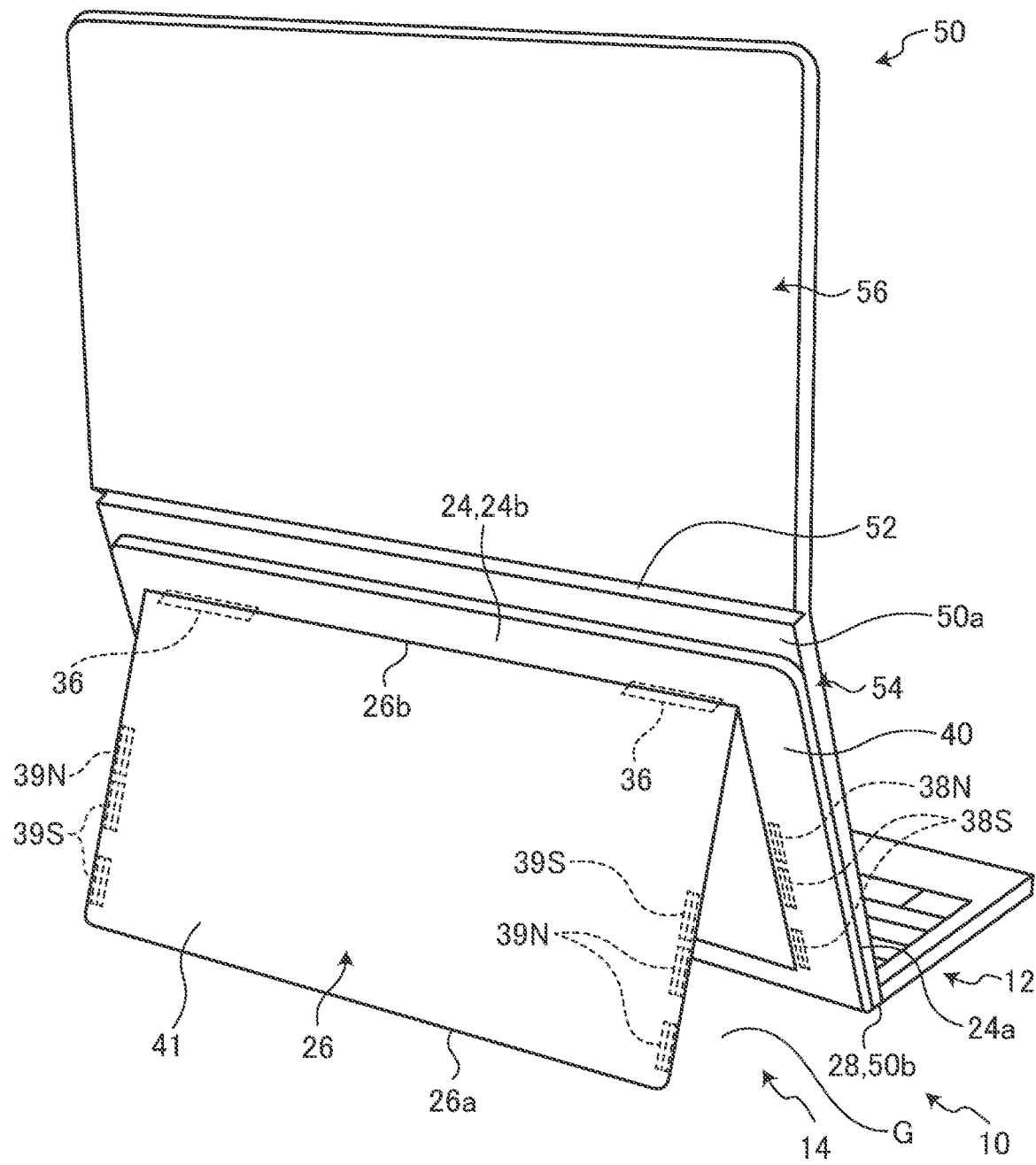
FIG. 5 is a schematic perspective view illustrating a state where an electronic apparatus is placed vertically and stands against the stand.

FIG. 3 is a front view of the stand 14. FIG. 4 is a perspective view of the stand 14 in an erect state. FIG. 5 is a schematic perspective view illustrating a state where an electronic apparatus 50 is placed vertically and stands against the stand 14. The stand 14 supports, for example, the thin electronic apparatus 50 as illustrated in FIG. 5 in an erect state. As illustrated in FIGS. 1 to 4, the stand 14 includes a supporting portion 24, a leg portion 26, a flexible member 28, and a bar 30.

The supporting portion 24 is a thin plate member having a rectangular frame shape. The supporting portion 24 is formed in a rectangular frame shape by forming a rectangular opening portion 32 on an inside thereof. One surface of the supporting portion 24 is a supporting surface 24a which a rear surface 50a of the electronic apparatus 50 is in contact with and which supports the rear surface 50a. The outer peripheral contour of the supporting portion 24 is substantially the same as the keyboard 12 in plan view. A plurality of magnets 34 are embedded at dispersed positions in the supporting portion 24. Each magnet 34 faces the supporting surface 24a. A magnet is provided on the rear surface 50a of the electronic apparatus 50, and the magnet 34 is provided at a position at which the magnet 34 is able to attract the magnet of the electronic apparatus 50.

The leg portion 26 is a rectangular plate which functions as a kickstand. The leg portion 26 is connected to the supporting portion 24 via a torque hinge 36 inside the opening portion 32 and is relatively rotatable about the supporting portion 24. In the case of the present embodiment, a pair of torque hinges 36 on the left and right sides are provided on one long side frame 24b of the supporting portion 24. The long side frame 24b forms an edge of the supporting portion 24 on a side far from the flexible member 28.

As illustrated in FIG. 1, for example, the torque hinge 36 is connected to the long side frame 24b by using a bracket 36a for the supporting portion 24, and is connected to a base edge 26b by using a bracket 36b for the leg portion 26. The brackets 36a and 36b are thin metal plates, for example, and are fixed to the supporting portion 24 and the leg portion 26 by using screws, double-sided tape, a bonding adhesive, or the like.

The leg portion 26 is rotatable at least between a first angular position and a second angular position. The first angular position is a position at which the leg portion 26 is accommodated inside the opening portion 32 and the opening portion 32 is closed without an approximate gap (refer to FIGS. 1 and 6). At the first angular position, the stand 14 is configured such that the supporting portion 24 and the leg portion 26 have a thin plate shape as a whole.

The second angular position is a position at which a tip edge 26a on a side of the leg portion 26 opposite to the torque hinge 36 side is in contact with a placement surface G and the stand 14 is erected (refer to FIG. 4). The placement surface G is, for example, an upper surface of a desk or table. The second angular position is, for example, a position at which the surface normal direction of the supporting portion 24 and the surface normal direction of the leg portion 26 are approximately 90 degrees (refer to FIG. 3). In addition, the leg portion 26 is connected to the base edge 26b on a side opposite to the tip edge 26a via the torque hinge 36.

The leg portion 26 is able to function as a kickstand even at an angle smaller than the angle at the second angular position, for example, an angle of about 30 degrees illustrated in FIG. 5. The leg portion 26 is able to function as a kickstand at an angle larger than the angle at the second angular position, for example, approximately 120 degrees. The torque hinge 36 generates a predetermined rotary torque in a case where the torque hinge 36 is set at least an angle at which the leg portion 26 functions as a kickstand, for example, 30 degrees or more. Thereby, the leg portion 26 can be kept at any angle with respect to the supporting portion 24. In addition, the stand 14 according to the present embodiment is configured such that the leg portion 26 opens in substantially only one direction with respect to the supporting portion 24. However, the stand 14 maybe configured such that the leg portion 26 opens in both directions. The leg portion 26 may have a shape other than the rectangular shape.

As illustrated in FIGS. 1 and 4, the stand 14 has a plurality of first magnets 38N and 38S embedded in the supporting portion 24 and a plurality of second magnets 39N and 39S embedded in the leg portion 26. The magnets 38N, 38S, 39N, and 39S serve as stoppers for attracting each other and keeping the leg portion 26 accommodated (first angular position). In the description of the present embodiment, the first magnet 38N is disposed in a form in which a desired attraction surface of the magnet is the N pole, and the first magnet 38S is disposed in a form in which a desired attraction surface of the magnet is the S pole. In addition, the same applies to second magnets 39N and 39S. It is apparent that the number of the provided magnets 38N, 38S, 39N, and 39S and the order of arrangement of the magnets 38N, 38S, 39N, and 39S are not limited to those illustrated in FIGS. 1 and 4.

As illustrated in FIGS. 1 to 5, the flexible member 28 is a sheet-like member having flexibility. The flexible member 28 is provided along an outer edge of a long side frame 24c on a side opposite to the long side frame 24b, and has a band shape protruding from the outer edge thereof. The flexible member 28 has a total length that is slightly shorter than a total length of the long side frame 24c, and a width capable of supporting a side surface 50b of the electronic apparatus 50.

The flexible member 28 is provided with a plurality of anti-slip members 51 on a first surface 28a continuous from the supporting surface 24a. The anti-slip member 51 extends along the longitudinal direction of the first surface 28a, and is, for example, a rod-like rubber. The anti-slip member 51 of the present embodiment is not provided on a second surface 28b, which is the rear surface of the first surface 28a, but may also be provided on the second surface 28b. In the in-use state posture of the stand 14 illustrated in FIGS. 4 and 5, the flexible member 28 is bent from the long side frame 24c and placed on the placement surface G in a state where the supporting portion 24 is kept at an appropriate angle.

The bar 30 is provided along a tip edge 28d opposite to a base edge 28c on the supporting portion 24 side of the flexible member 28. The bar 30 is a material that attracts the magnet, and is a cylindrical rod of an iron material (including an alloy such as a stainless steel material) in the present embodiment. The bar 30 is slightly longer than the flexible member 28, and portions protruding from the flexible member 28 are covered with caps 30a. The bar 30 is a part to be inserted into the recessed portion 16, and has a thickness and a length by which the bar 30 can be inserted into the recessed portion 16. The lengths of the recessed portion 16 and the bar 30 are substantially the same, and the bar 30 is not displaced in the elongated direction inside the recessed portion 16. The tip edge 28d of the flexible member 28 may be connected to the keyboard 12 in a non-detachable manner.

Figure 6:
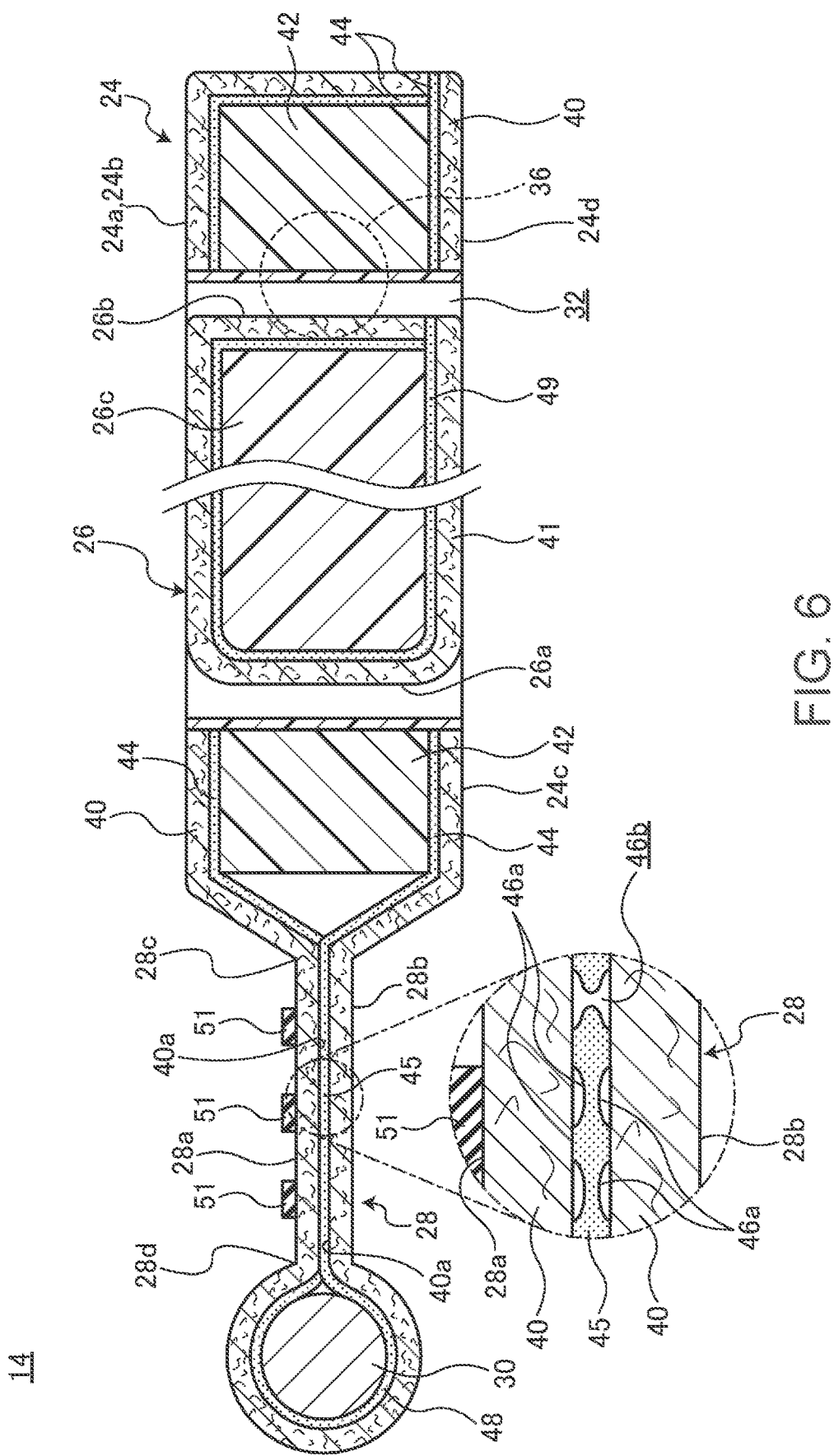
FIG. 6 is a schematic cross-sectional view taken along the line VI-VI in FIG. 3.

FIG. 6 is a schematic cross-sectional view taken along the line VI-VI in FIG. 3. As illustrated in FIG. 6, in the stand 14 of the present embodiment, the front surfaces of the supporting portion 24 and the flexible member 28 are formed of a surface material 40, and the front surface of the leg portion 26 is formed of a surface material 41. The surface materials 40 and 41 are fabric materials such as suedes, felts, or leathers, and each has some elasticity in the thickness direction. The surface materials 40 and 41 of the present embodiment are made of suede.

First, the supporting portion 24 is constituted of a plate-like member 42 which has a rectangular frame shape provided with the opening portion 32 on the inside thereof, and the surface material 40 which covers substantially the entire front surface of the plate-like member 42. The plate-like member 42 may be formed of a hard resin plate. The plate-like member 42 may be formed of a metal plate, a hard rubber plate, or the like. The surface material 40 is fixed onto the front surface of the plate-like member 42 via a first bonding layer 44, and covers the plate-like member 42 so as to wrap around the plate-like member 42.

The flexible member 28 is configured such that the two surface materials 40 and 40 are bonded via the second bonding layer 45. Thereby, the flexible member 28 is formed as a sheet-like member having flexibility and pliability. As schematically illustrated in an enlarged view enclosed by a one-dot chain line in FIG. 6, the second bonding layer 45 has an uneven shape 46a or a hole shape 46b formed at each location. On the other hand, the first bonding layer 44 does not form such an uneven shape 46a or a hole shape 46b. That is, the second bonding layer 45 has a lower coating density of the bonding adhesive than the first bonding layer 44. However, the details will be described later. Further, the second bonding layer 45 of the present embodiment has a single-layer structure. That is, the second bonding layer 45 has a structure in which the two surface materials 40 and 40 are bonded in a state where the bonding adhesive is provided on only one inner surface 40a of the two surface materials 40 and 40 to be bonded to each other and the bonding adhesive is not provided on the other inner surface 40a.

The surface material 40 of the present embodiment is formed of a single sheet, and the front surfaces of the supporting portion 24 and the flexible member 28 are formed of the single sheet. Specifically, the surface material 40 extends from the supporting surface 24a of the supporting portion 24 to the first surface 28a of the flexible member 28, is wound around the outer periphery of the bar 30, and is folded back. The surface material 40 is bonded to the bar 30 via the third bonding layer 48. The surface material 40 folded back at the bar 30 extends from the second surface 28b of the flexible member 28 to a rear surface 24d of the supporting portion 24, which is opposite to the supporting surface 24a. Further, the surface material 40 is bent from the supporting surface 24a side to the rear surface 24d side of the supporting portion 24 at the outer peripheral edge portion of the supporting portion 24, and also covers the outer peripheral side surface of the supporting portion 24. The flexible member 28 may have a configuration, in which the surface material 40 is bonded to the front surface of the flexible sheet such as a resin serving as a core material.

As the surface material 40, for example, two sheets may be used, and the supporting surface 24a and the first surface 28a and the rear surface 24d and the second surface 28b may be formed of different sheets from each other. Further, as the surface material 40, the supporting portion 24 and the flexible member 28 maybe formed of different sheets from each other.

Next, the leg portion 26 includes a rectangular plate-like member 26c and a surface material 41 that covers substantially the entire front surface of the plate-like member 26c. The plate-like member 26c can be formed of a plate which is made of the same or similar material as the plate-like member 42 described above. The surface material 41 is fixed onto the front surface of the plate-like member 26c via a leg portion bonding layer 49, and covers the plate-like member 26c so as to wrap around the plate-like member 26c. The surface material 41 is formed of a single sheet, and the single sheet forms the front surface of the leg portion 26. For example, the surface material 41 may be configured to cover each surface of the plate-like member 26c with two sheets.

Next, one procedure of the method of manufacturing the stand 14 will be described.

Figure 7:
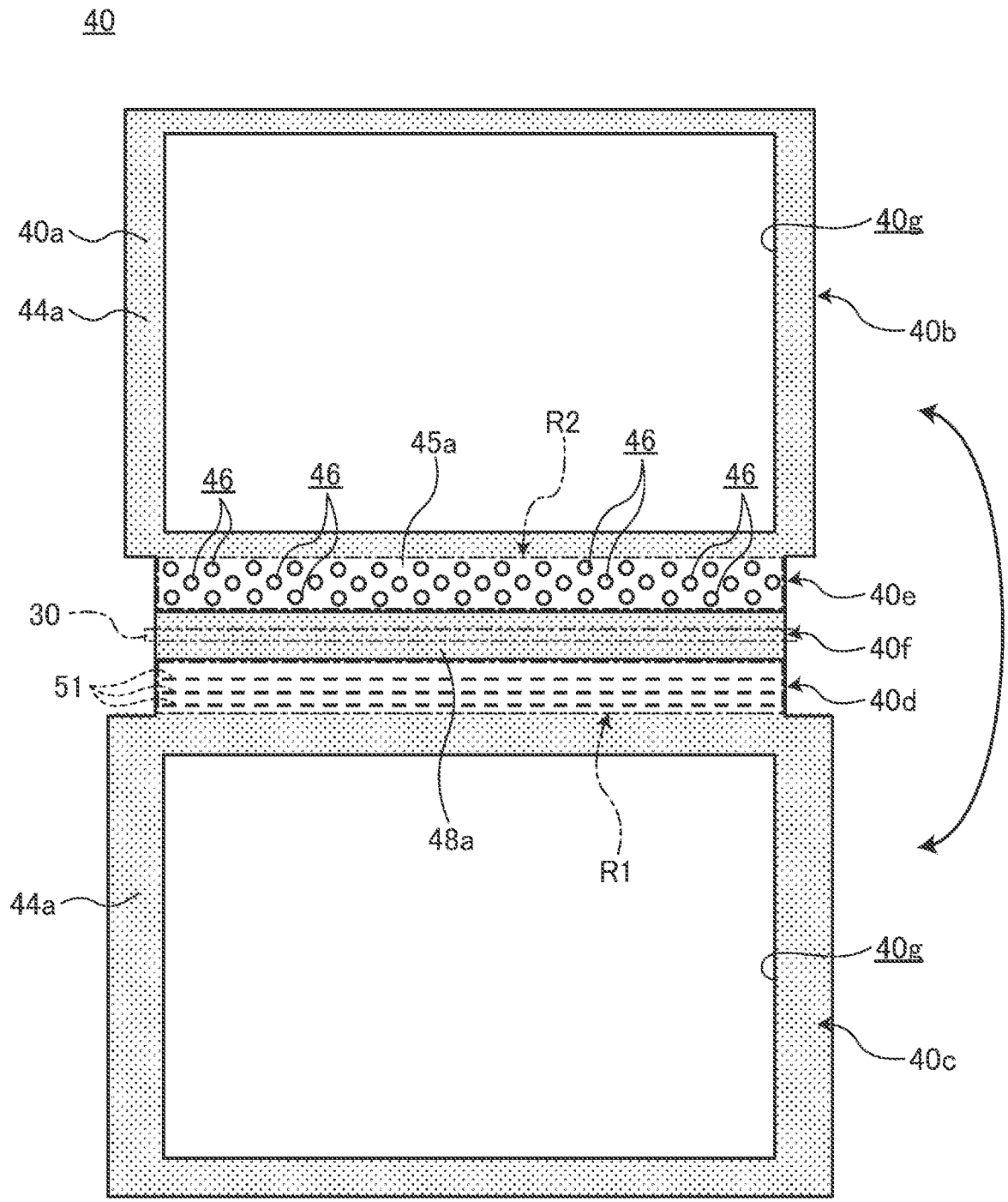
FIG. 7 is a schematic developed view of a surface material constituting a supporting portion and a flexible member.
Figure 8:
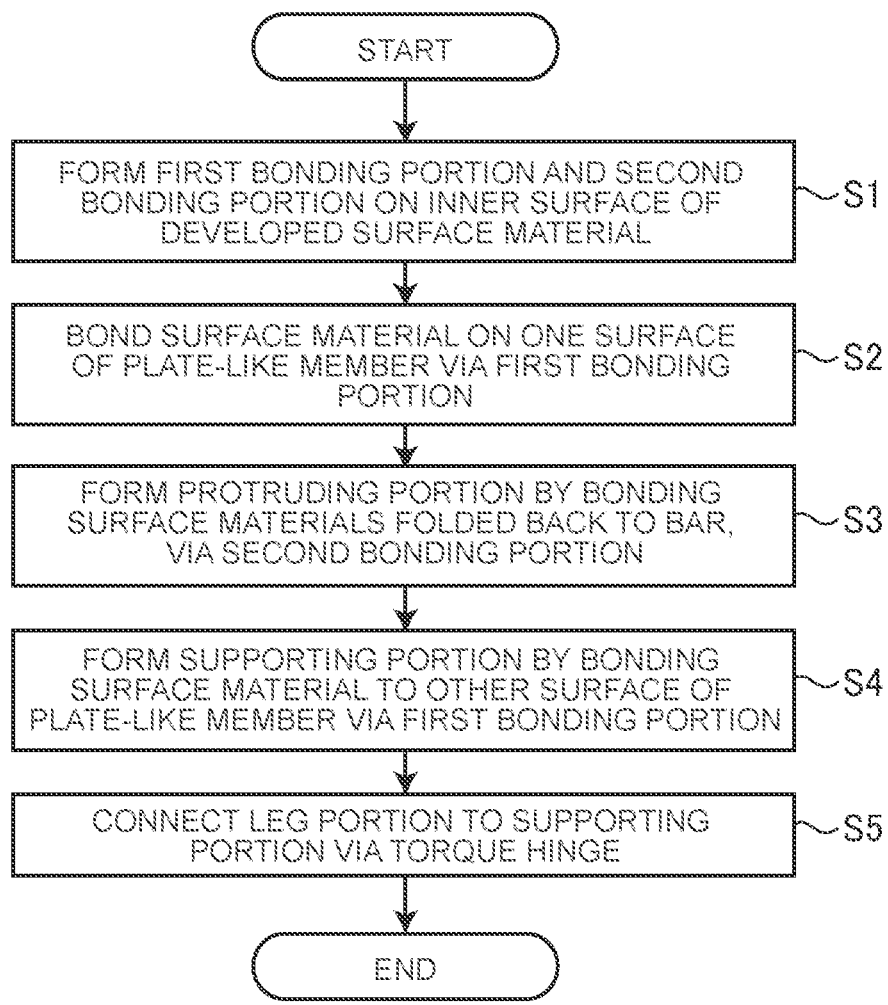
FIG. 8 is a flowchart illustrating a procedure of a method of manufacturing the stand.

FIG. 7 is a schematic developed view of the surface material 40 constituting the supporting portion 24 and the flexible member 28. FIG. 7 is a view of the surface material 40 as viewed from an inner surface 40a side on which the bonding layers 44 and 45 are provided. FIG. 8 is a flowchart illustrating a procedure of a method of manufacturing the stand 14.

First, as illustrated in FIG. 7, the surface material 40 is placed such that the inner surface 40a thereof faces in the front direction. The surface material 40 has a rear surface forming portion 40b that forms the rear surface 24d of the supporting portion 24, a supporting surface forming portion 40c that forms the supporting surface 24a, a first surface forming portion 40d that forms the first surface 28a of the flexible member 28, a second surface forming portion 40e that forms the second surface 28b, and a bar winding portion 40f that is wound around the bar 30. In addition, the supporting surface forming portion 40c also covers the outer peripheral side surface of the plate-like member 42. Therefore, the outer peripheral contour of the supporting surface forming portion 40c is one size larger than that of the rear surface forming portion 40b. Further, rectangular openings 40g, which constitute the opening portion 32, are respectively formed on the rear surface forming portion 40b and the supporting surface forming portion 40c.

Then, the bonding adhesive is provided on the inner surface 40a of the surface material 40 placed as illustrated in FIG. 7 to form a first bonding portion 44a and a second bonding portion 45a (step S1 in FIG. 8). In the present embodiment, a method is adopted in which a film-like bonding adhesive is laid so as to be pasted on the inner surface 40a to thereby form each of the bonding portions 44a and 44b. The bonding portions 44a and 44b may be formed by a method of coating with a bonding adhesive other than the film-like bonding adhesive, and may be formed by, for example, a method of coating with a liquid bonding adhesive or the like.

The first bonding portion 44a is a part that forms the first bonding layer 44. Therefore, the first bonding portion 44a is formed on each of the inner surface 40a of the rear surface forming portion 40b and the inner surface 40a of the supporting surface forming portion 40c.

The second bonding portion 45a is a part that forms the second bonding layer 45. As described above, the second bonding layer 45 of the present embodiment has a single-layer structure. Therefore, the second bonding portion 45a is formed only on the inner surface 40a of one second surface forming portion 40e of the first surface forming portion 40d and the second surface forming portion 40e that are bonded to each other to form the flexible member 28, and is not formed on the inner surface 40a of the other first surface forming portion 40d. As described above, the inner surface 40a of the first surface forming portion 40d is set as a non-bonding region R1 in which the bonding adhesive is not provided. On the other hand, the inner surface 40a of the second surface forming portion 40e is set as a bonding region R2 in which the bonding adhesive is provided, and the bonding region R2 forms the second bonding portion 45a.

As illustrated in FIG. 7, the second bonding portion 45a is formed of a film-like bonding adhesive having a porous structure with a large number of hole portions 46. The hole portion 46 is a part that forms the uneven shape 46a or the hole shape 46b described above in a case where the surface materials 40 are bonded to each other via the second bonding portion 45a to form the second bonding layer 45. The hole portion 46 is not provided in the first bonding portion 44a. As described above, in the present embodiment, the second bonding portion 45a has a large number of hole portions 46. Therefore, the coating density of the bonding adhesive in the second bonding portion 45a is smaller than that of the first bonding portion 44a. As a result, the coating density of the second bonding layer 45 is smaller than that of the first bonding layer 44.

In the case of the present embodiment, the bonding adhesive, which forms the second bonding portion 45a, has a film shape. Therefore, there is an advantage in that it is easy to form the hole portion 46 as compared with a case where the inner surface 40a is coated with the liquid bonding adhesive. The shape of the hole portion 46 may be a shape other than a circular shape, and the second bonding portion 45a may have a configuration, in which coating of the bonding adhesive having a mesh shape is performed, or the like.

As illustrated in FIG. 7, the inner surface 40a of the bar winding portion 40f is provided with a film-like bonding adhesive without the hole portion 46 to form a third bonding portion 48a, in a similar manner to the first bonding portion 44a described above. The third bonding portion 48a is a part that forms a third bonding layer 48.

Next, in step S2, the rear surface forming portion 40b is bonded to the front surface of the plate-like member 42 on the rear surface 24d side via the first bonding portion 44a. Subsequently, in step S3, the bar winding portion 40f is wound around the outer peripheral surface of the bar 30, and the surface material 40 is folded back. Then, the two folded-back surface materials 40 and 40, that is, the first surface forming portion 40d and the second surface forming portion 40e are bonded to each other via the second bonding portion 45a to form the flexible member 28. In addition, the anti-slip member 51 may be fixed onto the outer surface of the first surface forming portion 40d in advance, or may be fixed onto the outer surface of the first surface forming portion 40d after step S4 or S5.

In step S4, the supporting surface forming portion 40c is bonded to the front surface of the plate-like member 42 on the supporting surface 24a side via the first bonding portion 44a. Then, the outer peripheral edge portion of the supporting surface forming portion 40c is appropriately bent to cover the outer peripheral side surface of the plate-like member 42, thereby forming the supporting portion 24. It should be noted that the order of performing in steps S2 and S4 may be reversed.

Finally, the leg portion 26 is connected to the supporting portion 24 via the torque hinge 36 (step S5). Thereby, manufacturing of the stand 14 is completed. The leg portion 26 may be manufactured in advance by bonding the surface material 41 to the front surface of the plate-like member 26c via the leg portion bonding layer 49 in a step separate from steps S1 to S4. At this time, in a case where the surface material 41 constituting the leg portion 26 uses, for example, a material of the end in which the opening 40g is cut out from the surface material 40, the material cost can be reduced.

Next, an example of how to use the keyboard-stand set 10 will be described.

In the keyboard-stand set 10 including such a stand 14, in a case where the stand 14 is mounted on the keyboard 12, as illustrated in FIG. 2, in a case where the bar 30 is inserted into the recessed portion 16, the bar 30 is attracted and fixed by the magnet 18. Thereby, the keyboard 12 and the stand 14 are combined. In this state, the flexible member 28, which connects the stand 14 and the keyboard 12, is able to also function as a flexible hinge. That is, in the keyboard-stand set 10, the stand 14 can be folded to be overlapped on the upper surface of the keyboard 12 by bending the flexible member 28, and can be configured to be compact in a case of carrying the keyboard-stand set 10 or the like. On the other hand, in a case where the stand 14 is pulled from the keyboard 12, the bar 30 comes out of the recessed portion 16 against the attraction force of the magnet 18. Thereby, the stand 14 is removed from the keyboard 12.

As an example of the electronic apparatus 50 supported by the stand 14 according to the present embodiment, a so-called foldable PC can be exemplified as illustrated in FIG. 5. It is apparent that the stand 14 and the keyboard-stand set 10 are also applicable to other thin electronic apparatuses such as a tablet PC and a smartphone.

The electronic apparatus 50 is a foldable PC, and includes a first chassis 54 and a second chassis 56 which are connected via a central hinge portion 52. On the rear side of the rear surface 50a of the electronic apparatus 50, a foldable display 58 over substantially the entire surface from the first chassis 54 to the second chassis 56 is provided (refer to FIG. 10). The display 58 is, for example, a touch panel type organic EL. The electronic apparatus 50 can be input through a software keyboard displayed on the display 58, and may be input from the keyboard 12. In a case where the first chassis 54 and the second chassis 56 are folded at the hinge portion 52, the display 58 is also folded.

As illustrated in FIG. 5, the keyboard-stand set 10 is able to keep the electronic apparatus 50 in a state of being vertically erect. The first chassis 54 is provided with an attracting member such as a magnet or an iron material at a position corresponding to the magnet 34 of the supporting portion 24. In such a case, the supporting portion 24 of the stand 14 supports only the first chassis 54, the second chassis 56 protrudes from the stand 14, and the position of the barycenter thereof is slightly high. However, the stand 14 attracts the first chassis 54 due to magnetic force, and thus the electronic apparatus 50 is stabilized. It is apparent that the keyboard-stand set 10 is able to also keep the electronic apparatus 50 in a state where the electronic apparatus 50 is erected horizontally. In such a case, although there is no attraction due to the magnetic force between the stand 14 and the first chassis 54, the electronic apparatus 50 is stable since the position of the barycenter is low in a state where the chassis 54 and 56 are aligned on the left and right.

The electronic apparatus 50 has the side surface 50b which is in contact with the first surface 28a of the flexible member 28 and is stabilized without slipping due to the action of the anti-slip member 51. Since the leg portion 26 is able to be kept at an optional angle due to the action of the torque hinge 36, the tilt angle of the supporting portion 24 can be adjusted for easy viewing of the display 58.

Since the keyboard 12 is a wireless type keyboard, a wired connection with the electronic apparatus 50 is unnecessary. Therefore, even in a case where the keyboard 12 is removed from the stand 14 and placed at a place some distance away, operations such as keyboard input are possible.

As described above, the stand 14 of the present embodiment includes the supporting portion 24, the leg portions 26, the flexible member 28, and the surface material 40 that forms the front surfaces of the supporting portion 24 and the flexible member 28. Here, the bonding layers 44 and 45, which fix the surface material 40, are formed such that the coating density of the bonding adhesive in the second bonding layer 45 which fixes the surface material 40 onto the flexible member 28 is smaller than that of the first bonding layer 44 which fixes the surface material 40 onto the supporting portion 24.

In such a manner, the stand 14 is configured such that the coating density of the bonding adhesive in the second bonding layer 45 in the flexible member 28, which is required to be pliable, is smaller than the coating density of the bonding adhesive in the first bonding layer 44 in the supporting portion 24. Therefore, the pliability of the flexible member 28 is prevented from being impaired by the second bonding layer 45, which is cured after the surface material 40 is bonded. Therefore, high pliability can be obtained. As a result, for example, in a case where the flexible member 28 supports the side surface 50b of the electronic apparatus 50 on the placement surface G or functions as a flexible hinge between the stand 14 and the keyboard 12, high pliability is obtained. Therefore, the operability during bending and the followability to the placement surface G are improved. Further, the pliability of the flexible member 28 is improved. Therefore, it is possible to prevent the bar 30 from falling off from the magnet 18 in a case where the stand 14 is folded to be overlapped on the upper surface of the keyboard 12 by bending the flexible member 28. Moreover, the pliability of the flexible member 28 is improved by using the second bonding layer 45 that is not visible in appearance. Therefore, it is not necessary to provide a structure for improving pliability of a notch on the outer surface or the like, for example. On the other hand, the coating density of the bonding adhesive in the first bonding layer 44 in the supporting portion 24, which is required to be rigid, is higher than the coating density of the bonding adhesive in the second bonding layer 45. Therefore, the stability of the stand 14 in a case where the stand 14 is erected is improved. Thus, it is possible to further suppress the wobbling of the electronic apparatus 50 in a case where the electronic apparatus 50 is erected.

In particular, the flexible member 28 of the present embodiment is configured such that two surface materials 40 and 40, which are formed of a fabric material such as suede, are bonded to each other via the second bonding layer 45. For this reason, in the flexible member 28, the coating density of the bonding adhesive in the second bonding layer 45 is low. Therefore, the pliability originally possessed by the material of the surface material 40 can be prevented from being impaired, and higher pliability can be ensured.

At this time, the second bonding layer 45 has a single-layer structure in which the bonding adhesive is provided only on one of the two surface materials 40 and 40. Therefore, the flexible member 28 is able to suppress the thickness of the second bonding layer 45 to the minimum, and the pliability is further improved. In addition, the above description shows the example of the manufacturing method in which no bonding adhesive is provided on the first surface forming portion 40d of the surface material 40 that forms the first surface 28a of the flexible member 28 and the bonding adhesive is provided on only the second surface forming portion 40e that forms the second surface 28b. However, the bonding adhesive may be provided on any of the forming portions 40d and 40e. However, the first surface forming portion 40d is provided with the anti-slip member 51 on the outer surface thereof. Therefore, in a case where the bonding adhesive is provided on the first surface forming portion 40d, the bonding pressure is uneven due to the unevenness of the anti-slip member 51 in bonding between the forming portions 40d and 40e. Thus, there is also a possibility that the forming portions 40d and 40e may not be evenly bonded. In this respect, in the present embodiment, the bonding adhesive is provided to the second surface forming portion 40e which does not have the anti-slip member 51. Therefore, there is an advantage that occurrence of such a defect can be suppressed.

Figure 9:
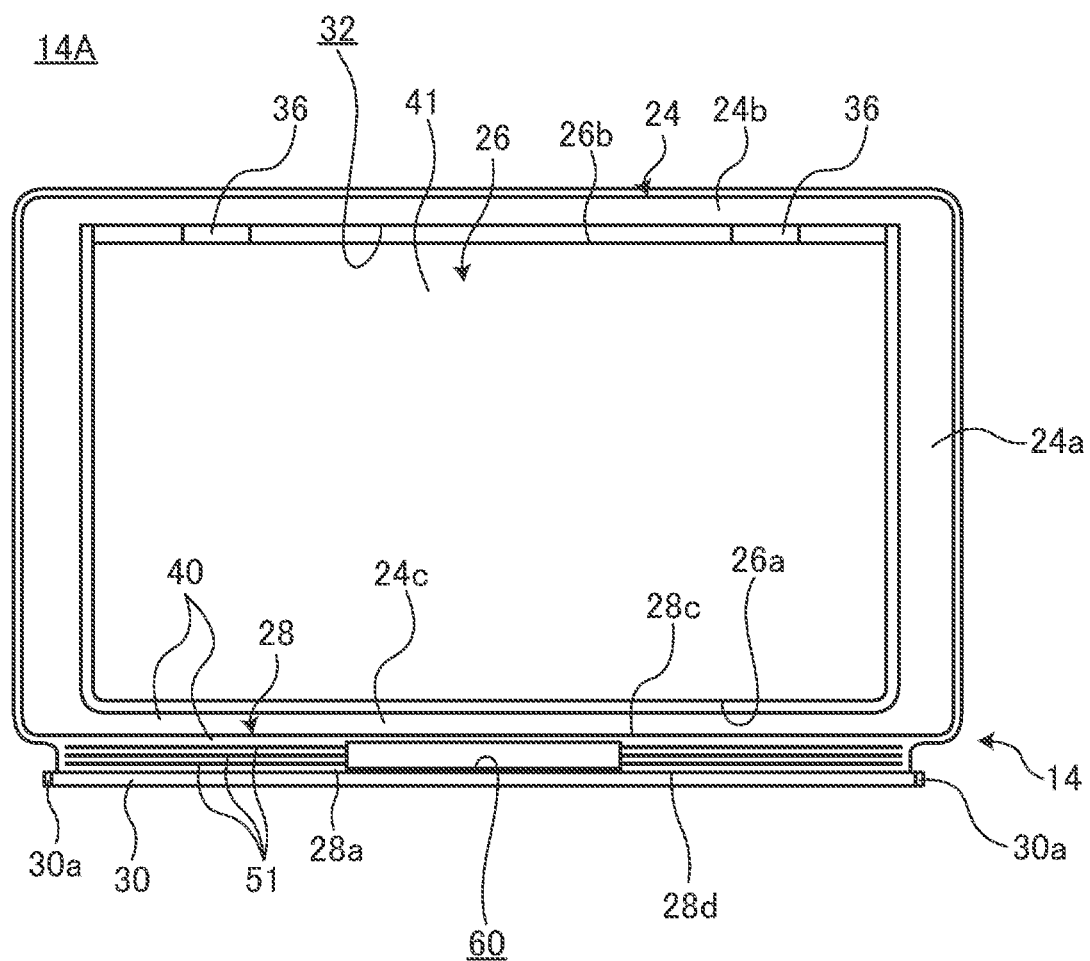
FIG. 9 is a front view of a stand according to a modification example.
Figure 10:
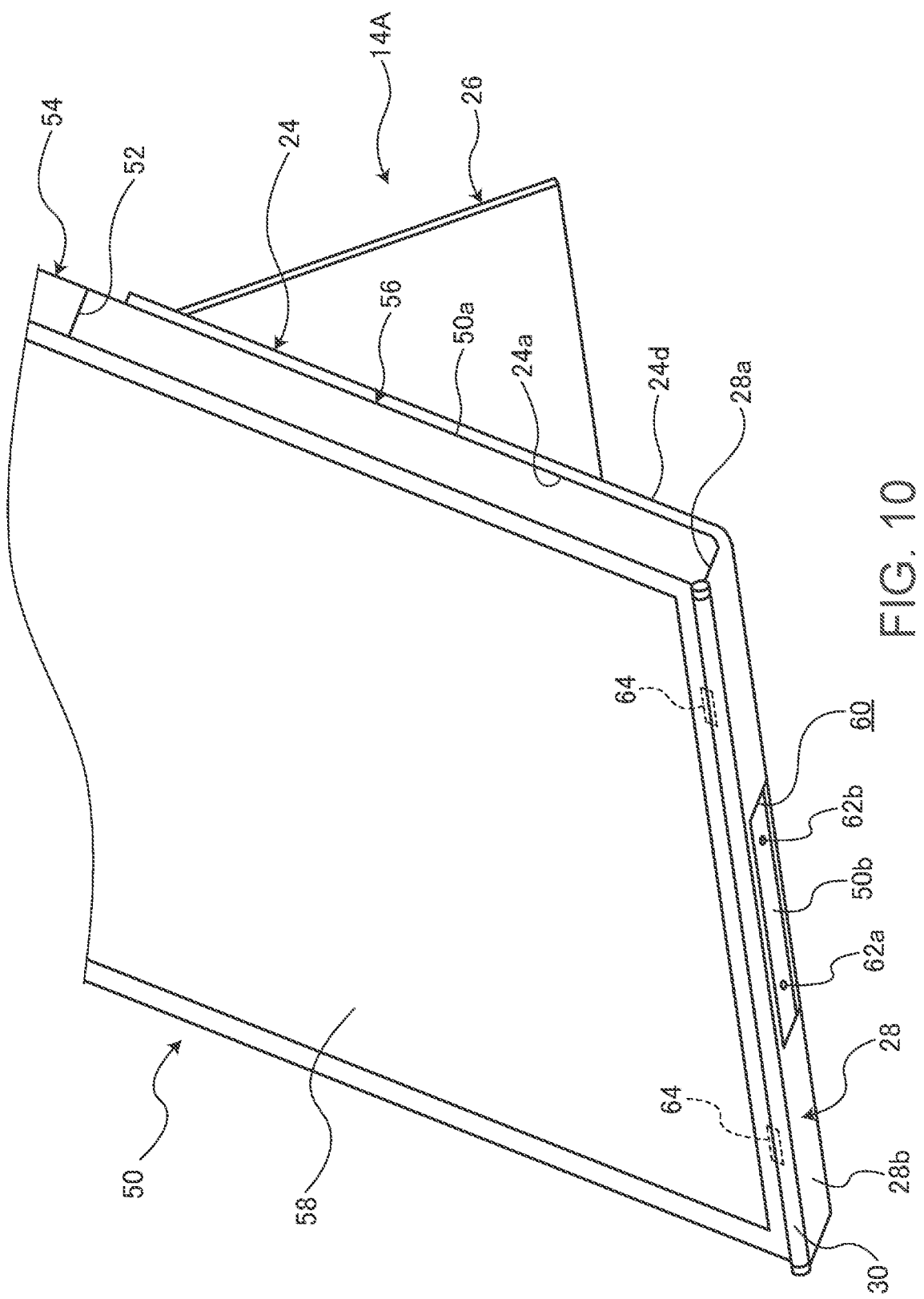
FIG. 10 is a partially enlarged schematic perspective view illustrating a state where the electronic apparatus is placed vertically and stands against the stand illustrated in FIG. 9.

FIG. 9 is a front view of a stand 14A according to a modification example. FIG. 10 is a partially enlarged schematic perspective view illustrating a state where the electronic apparatus 50 is placed vertically and stands against the stand 14A illustrated in FIG. 9. In addition, in FIGS. 9 and 10, the same reference numerals as the reference numerals illustrated in FIGS. 1 to 8 indicate the same or similar configurations. Therefore, the same or similar functions and effects are achieved, and detailed description thereof will be omitted.

In the stand 14A illustrated in FIGS. 9 and 10, the flexible member 28 is different from the stand 14 described above in that the flexible member 28 includes the cutout hole 60. The cutout hole 60 is, for example, a rectangular cutout hole which is formed at a substantially center in the longitudinal direction of the flexible member 28, and has a certain length and width.

As illustrated in FIG. 10, for example, a pair of microphone holes 62a and 62b are formed on the side surface 50b of the electronic apparatus 50. The microphone holes 62a and 62b are fine hole portions for passing external sound toward the microphone provided in the second chassis 56 of the electronic apparatus 50. The cutout hole 60 is provided at a position at which the side surface 50b overlaps with the microphone holes 62a and 62b in a case where the side surface 50b is placed on the first surface 28a of the flexible member 28, and does not cover the microphone holes 62a and 62b. The reference numeral 64 in FIG. 10 is a magnet which is provided on an upper surface of the electronic apparatus 50 and which attracts the chassis 54 and 56 in order to keep the folded state in a case of folding between the chassis 54 and 56.

Therefore, in the stand 14A, in a case where the side surface 50b is placed on the first surface 28a of the flexible member 28 to support the electronic apparatus 50, for example, the bar 30 may be attracted to the magnet 64, and may cover the side surface 50b such that the flexible member 28 is wound. Even in such a case, the microphone holes 62a and 62b are exposed through the cutout hole 60.

That is, in the stand 14 which does not have the cutout hole 60, in a case where the flexible member 28 causes fine vibration due to an angle adjustment of the leg portion 26, a touch operation with respect to the display 58, or the like, there is also a concern that the vibration has an effect on the microphone holes 62a and 62b. In such a case, the gain of the microphone of the electronic apparatus 50 may decrease, and there is a possibility that ambient voice or the like is unlikely to be appropriately collected. In this respect, in the stand 14A, the microphone holes 62a and 62b are exposed through the cutout hole 60, and thus such a decrease in gain can be suppressed. In particular, the stand 14A is provided with the flexible member 28 having high pliability, like the stand 14. Therefore, the flexible member 28 easily wind around the side surface 50b, and the cutout hole 60 is further effective. The shape and arrangement of the cutout hole 60 are appropriately changeable as long as the shape or arrangement does not cover the microphone hole of the electronic apparatus on which the stand 14A is supposed to be used.

The present invention is not limited to the above-described embodiment, and there is no doubt that the present invention can be freely changed without departing from the gist of the present invention.

In the configuration exemplified in the above description, the stands 14 and 14A are connected to the keyboard 12. However, the stands 14 and 14A may be used as a single stand that is not connected to the keyboard 12. In such a case, in the stands 14 and 14A, the bar 30 may be used to be attracted to the magnet 64 of the electronic apparatus 50, similarly to, for example, the stand 14A illustrated in FIG. 10.

The invention claimed is:

1. A stand that is configured to support an electronic apparatus in an erect state, the stand comprising:
a supporting portion having a supporting surface that is configured to support a rear surface of the electronic apparatus;
a leg portion rotatably connected to the supporting portion via a hinge;
a flexible member in a sheet shape, and that is along and protrudes from one edge of the supporting portion;
a surface material that is flexible and forms front surfaces of the supporting portion and of the flexible member;
a first bonding layer that fixes the surface material onto the supporting portion; and
a second bonding layer that has a lower coating density of a bonding adhesive than that of the first bonding layer and fixes the surface material onto the flexible member.

2. The stand according to claim 1,
wherein the second bonding layer includes an uneven shape or a hole shape.

3. The stand according to claim 1,
wherein the flexible member includes two surface materials that are bonded together with the second bonding layer, and the second bonding layer has a single-layer structure.

4. The stand according to claim 3, further comprising:
a bar along a tip edge of the flexible member and on a side opposite to the one edge side of the supporting portion and that is of a material capable of being attracted to a magnet,
wherein the flexible member includes the two surface materials, which are wound around the bar and folded back, with the second bonding layer.

5. The stand according to claim 1,
wherein the flexible member has a width configured to support a side surface of the electronic apparatus,
wherein the electronic apparatus has a microphone hole on the side surface, and
the flexible member has a cutout hole that exposes the microphone hole without covering the microphone hole, when the flexible member supports at least the side surface of the electronic apparatus.

6. A method of manufacturing a stand that is configured to support an electronic apparatus in an erect state, the method comprising:
a bonding portion formation step of providing a bonding adhesive on an inner surface of a surface material formed in a sheet shape and forming a first bonding portion and a second bonding portion, wherein the second bonding portion has a lower coating density of a bonding adhesive than that of the first bonding portion;
a supporting portion formation step of forming a supporting portion that is configured to support a rear surface of the electronic apparatus by bonding the surface material to a plate-like member via the first bonding portion, after the bonding portion formation step;
a flexible member formation step of forming a flexible member in a sheet shape, and which is provided along one edge of the supporting portion so as to protrude from the one edge, by bonding two surface materials via the second bonding portion, after the bonding portion formation step; and
a leg portion mount step of rotatably mounting a leg portion on the supporting portion via a hinge, after the supporting portion formation step.

7. The method of manufacturing the stand according to claim 6,
wherein in the bonding portion formation step,
the first bonding portion is formed by providing the bonding adhesive in a film shape on an inner surface of the surface material, and
the second bonding portion is formed by the bonding adhesive having holes and having the film shape on the inner surface of the surface material.

8. The method of manufacturing the stand according to claim 6, wherein in the bonding portion formation step, the second bonding portion is provided only on an inner surface of one surface material of the two surface materials which are bonded in the flexible member formation step, and an inner surface of the other surface material is not coated with the bonding adhesive, and in the flexible member formation step, the one surface material and the other surface material are bonded via the second bonding portion on the inner surface of the one surface material.

9. A keyboard-stand set comprising:
a keyboard for wirelessly inputting to an electronic apparatus; and
a stand for supporting the electronic apparatus in an erect state,
wherein the stand includes:
 a supporting portion having a supporting surface that is configured to support a rear surface of the electronic apparatus,
 a leg portion rotatably connected to the supporting portion via a hinge,
 a flexible member in a sheet shape, that is along and protrudes from one edge of the supporting portion, and that functions as a flexible hinge which rotatably connects the stand and one edge of the keyboard,
 a surface material that is flexible and forms front surfaces of the supporting portion and of the flexible member,
 a first bonding layer that fixes the surface material onto the supporting portion, and
 a second bonding layer that has a lower coating density of a bonding adhesive than that of the first bonding layer and fixes the surface material onto the flexible member.

10. The keyboard-stand set according to claim 9,
wherein a magnet is on one edge of the keyboard,
the stand includes a bar that is along a tip edge of the flexible member on a side opposite to one edge side of the supporting portion and that is of a material capable of being attracted to a magnet, and is configured to be attachable to and detachable from the keyboard, and
the flexible member has two surface materials which are wound around the bar and folded back, and are bonded with the second bonding layer.

* * * * *